(12) United States Patent
Cankovic et al.

(10) Patent No.: US 8,196,409 B2
(45) Date of Patent: Jun. 12, 2012

(54) GAS TURBINE ENGINE FUEL SUPPLY ARRANGEMENT USING PLURAL DISTINCT FUELS

(75) Inventors: Damir Cankovic, Karlovac (HR); Oliver Konradt, Endingen (CH); Albert Keller, Neuenhof (CH)

(73) Assignee: Alstom Technology Ltd, Baden (CH)

( * ) Notice: Subject to any disclaimer, the term of this patent is extended or adjusted under 35 U.S.C. 154(b) by 791 days.

(21) Appl. No.: 12/370,759

(22) Filed: Feb. 13, 2009

(65) Prior Publication Data

US 2009/0211257 A1 Aug. 27, 2009

(30) Foreign Application Priority Data

Feb. 13, 2008 (EP) .................................... 08101563

(51) Int. Cl.
*F02C 1/00* (2006.01)
*F02G 3/00* (2006.01)
(52) U.S. Cl. ........... 60/737; 60/742; 60/734; 60/39.463; 60/740
(58) Field of Classification Search .................... 60/737, 60/734, 39.463, 39.465, 740, 742, 746, 747
See application file for complete search history.

(56) References Cited

U.S. PATENT DOCUMENTS

| 4,932,861 | A | 6/1990 | Keller et al. |
| 5,457,953 | A | 10/1995 | Etheridge |
| 5,588,826 | A | 12/1996 | Dobbeling et al. |
| 5,765,366 | A | 6/1998 | Beeck et al. |
| 6,901,760 | B2 * | 6/2005 | Dittmann et al. ................ 60/773 |
| 7,140,183 | B2 * | 11/2006 | Ruck et al. ....................... 60/737 |
| 7,241,138 | B2 * | 7/2007 | Flohr et al. ..................... 431/350 |
| 2002/0124549 | A1 * | 9/2002 | Dittmann et al. ............ 60/39.23 |

FOREIGN PATENT DOCUMENTS

| EP | 0148599 | 7/1985 |
| EP | 0321809 | 6/1989 |
| EP | 0704657 | 4/1996 |
| EP | 0757164 | 2/1997 |
| WO | 9219913 | 11/1992 |
| WO | 9600345 | 1/1996 |

* cited by examiner

*Primary Examiner* — William H Rodriguez
(74) *Attorney, Agent, or Firm* — Volpe and Koenig, P.C.

(57) ABSTRACT

A fuel supply arrangement for a gas turbine burner is provided. The fuel distribution arrangement includes a rear section external to the burner located between a turbine wall and a fuel distribution system interface directing fuel into fuel supply circuits. The fuel distribution system interface has four fuel connections. An intermediate section is located between the turbine wall and the backside wall of a distribution chamber; and a front section in front of the second section located between said backside wall of the distribution chamber and a burner central backside block. The fuel distribution arrangement includes pipes for gaseous fuel, liquid fuel, as well as pilot gas, and liquid pilot fuel. In the rear section the pipes for gaseous fuel and for liquid fuel are arranged concentrically, and in at least one portion of the intermediate section the pipe for gaseous fuel is arranged non-concentrically with the liquid fuel pipe.

14 Claims, 3 Drawing Sheets

GAS TURBINE ENGINE FUEL SUPPLY ARRANGEMENT USING PLURAL DISTINCT FUELS

FIELD OF INVENTION

This invention relates to a fuel supply system arrangement for a premixing burner in the operation of a gas turbine and is suited for gaseous and/or liquid fuel supply. It provides (premix) fuel and pilot fuel for combustion as well as a mounting support for the fuel lance and the burner-swirl body inside an engine.

BACKGROUND

Premixing burners for the operation of gas turbine plants are operated with different fuel feed systems. It is a challenge to cover the entire load range of a gas turbine, i.e. from the ignition and starting phase up to the full-load range. This is achieved by supplying premixing burners with pilot gas during starting and in lower load ranges, whereas after the start-up phase, premix fuel is supplied to the system in order to raise the burner capacity. A good coordination between the pilot gas supply and the premix fuel supply in connection with the simultaneous feed of different mediums therefore is aspired.

Burners in common combustion systems are usually provided with fuel supply systems in which the gaseous fuel pipe is conducted to the combustion chamber concentrically with the liquid fuel pipe.

SUMMARY

The present disclosure is directed to a fuel supply arrangement for a gas turbine burner. The fuel distribution arrangement includes a rear section external to the burner located between a turbine wall and a fuel distribution system interface that directs fuel into fuel supply circuits. The fuel distribution system interface has four fuel connections that are for liquid fuel, gaseous fuel, pilot gas and liquid pilot fuel. An intermediate section is located between the turbine wall and the backside wall of a distribution chamber. A front section in front of the second section is located between said backside wall of the distribution chamber and a burner central backside block. The fuel distribution arrangement includes a pipe for gaseous fuel, a pipe for liquid fuel, particularly oil, as well as a pipe for pilot gas, and a pipe for liquid pilot fuel. In the rear section the pipe for gaseous fuel and the pipe for liquid fuel are arranged concentrically, and in at least one portion of the intermediate section, the pipe for gaseous fuel is arranged non-concentrically with the liquid fuel pipe.

BRIEF DESCRIPTION OF THE DRAWINGS

In the accompanying drawings preferred embodiments of the invention are shown in which.

DETAILED DESCRIPTION OF THE PREFERRED EMBODIMENTS

Introduction to the Embodiments

Figure 1:
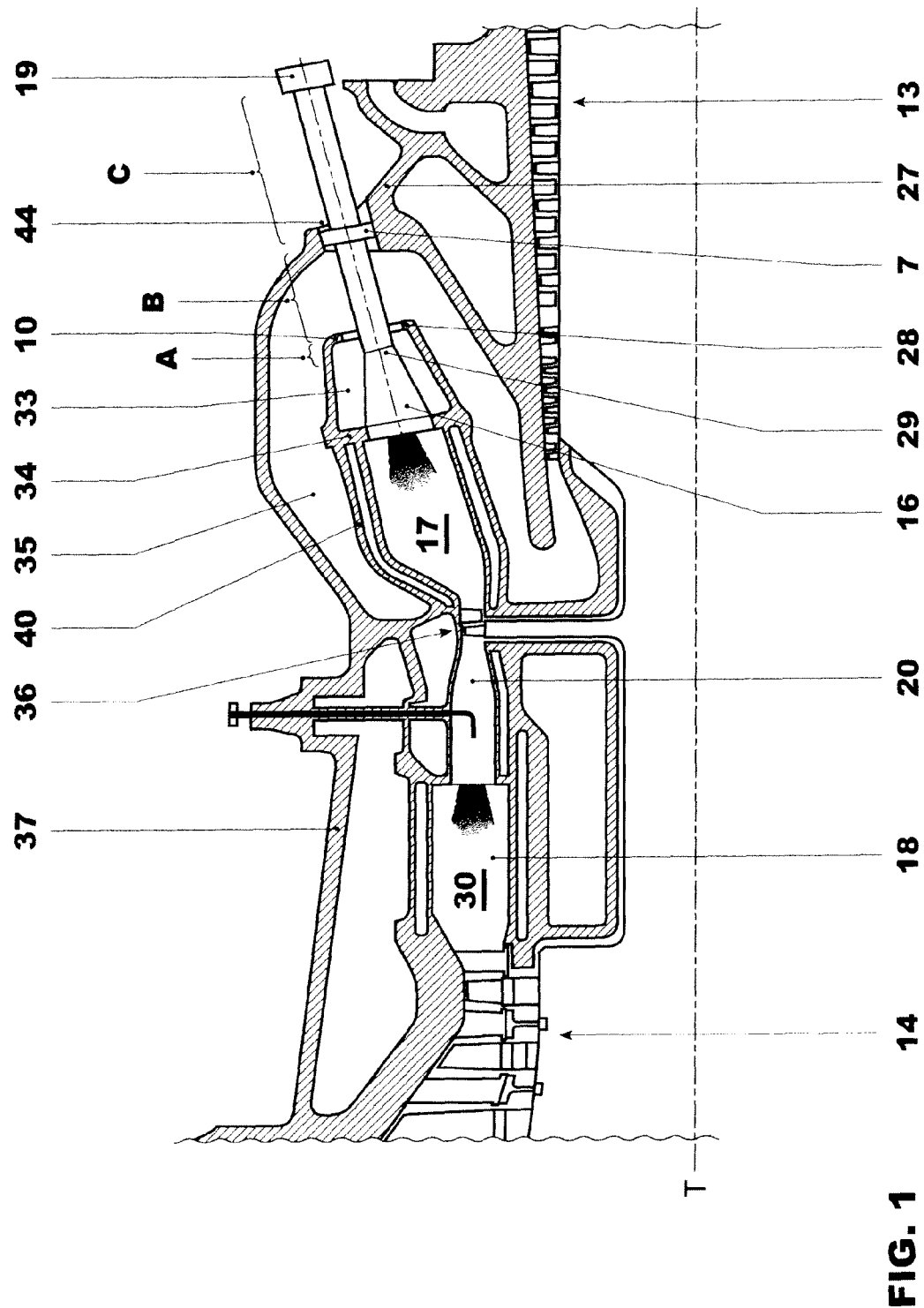
FIG. 1 is a schematic axial cut through a two-chamber gas turbine according to the state of the art.

An improved fuel supply system for Premix-burners (as called EV-Burner) generally of the type as for instance described in EP-A1-0 321 809, is provided, particularly for an advanced Premix burner (as called AEV-burner), generally of the type as for instance described in EP-A1-0 704 657, so as to allow a facilitated assembly and maintenance, minimized pipe size and maximum flexibility of pipe conduct. The contents of EP-A1-0 321 809 and EP-A1-0 704 657 are incorporated by reference into this application as if fully set forth.

Fuel supply systems of the state of the art entail problems in terms of mounting and maintenance of the fuel pipes, particularly of the fuel lance used for liquid fuel piping. In addition, the pipes used to pipe the gaseous fuel have to be of a rather large diameter so as to house the fuel lance for the liquid fuel concentrically within it. If one pipe needs to be exchanged, or maintenance has to be performed in either of the pipes, both the liquid fuel pipe (preferably the fuel lance) and the gaseous fuel pipes have to be disassembled. Also, due to the concentric arrangement of the liquid fuel- and the gaseous fuel pipes, thermal expansion cannot be compensated easily.

None of the existing fuel supply systems can solve these problems, as long as the fuel lance is conducted coaxially and concentrically within the gaseous fuel pipe, particularly within the inner of two pipes comprising the gaseous fuel pipe.

The above problem is solved by providing a fuel supply arrangement for a gas turbine burner, preferably a double cone or four-cone burner, said fuel distribution arrangement comprising a rear section external to the burner located behind a turbine wall between a fuel distribution system interface directing fuel into fuel supply circuits, said fuel distribution system interface having four fuel connections, being for gaseous fuel, pilot gas and liquid pilot fuel, e.g. oil; an intermediate section located between the turbine wall and the backside wall of a distribution chamber; and a front section in front of the second section located between said backside wall of the distribution chamber and a burner central backside block; said fuel distribution arrangement comprising a pipe for gaseous fuel, a pipe for liquid fuel, particularly oil, as well as a pipe for pilot gas, and a pipe for liquid pilot fuel, particularly pilot oil. In the rear section, the pipe for gaseous fuel and the pipe for liquid fuel are arranged concentrically, and in at least one portion of the intermediate section the pipe for gaseous fuel is arranged non-concentrically with the liquid fuel pipe.

The fuel supply system arrangement is suited for example for an advanced environmental friendly v-shaped premix-burner (AEV-burner), or any other burner with similar interface in an engine. The AEV-burners are capable of pre-vaporizing and premixing liquid fuel prior to combustion.

The key feature of the disclosure is therefore the fact that at least over a portion of the fuel supply arrangement, the gaseous fuel pipe and the liquid fuel pipe are provided as non-concentric pipes conducted parallel to each other over at least one portion of the front- and/or intermediate- and/or rear sections(s) of the fuel supply arrangement. In addition, the piloting tubes, i.e. the pipes for pilot gas and/or liquid pilot fuel are preferably provided as separate tubes extending over the full length of the fuel supply arrangement until the corresponding injection ports into the combustion chamber. The eccentric fuel supply allows a better cyclic life and eigenfrequency.

In a first preferred embodiment, in at least one portion of the intermediate section, the gaseous fuel pipe is comprised of at least one pipe outside the periphery of the wall of the liquid fuel pipe.

In another preferred embodiment, in at least one portion of the intermediate section the gaseous fuel pipe is comprised of more than 1, preferably 2, 3, 4, or 5 pipes.

In the rear section of a further preferred embodiment, the gaseous fuel pipe is comprised of and/or bordered by an inner pipe and an outer pipe and that in the rear section the liquid gas pipe is arranged coaxially and concentrically within said inner gaseous fuel pipe.

According to another preferred embodiment, in at least one portion of the rear section the pilot gas pipe and/or the liquid pilot fuel pipe is guided within the gaseous fuel pipe.

In the rear section of a further embodiment, the liquid fuel entry port is located in the fuel distribution system interface such that the liquid fuel is axially introduced into the liquid fuel pipe from the rear and that the gaseous fuel entry port and/or the pilot gas entry port is located in the fuel distribution system connection block such that the gaseous fuel and/or the pilot gas is radially insertable into the gaseous fuel pipe and/or the pilot gas pipe and/or the liquid pilot fuel pipe, preferably perpendicular to the liquid fuel flow direction.

It is of further advantage, if in at least one portion of the rear section at least some of the fuel pipes are arranged as three concentric pipes. Preferably, the fuel lance is the innermost of the concentrically arranged pipes, followed outwardly by the inner gaseous fuel pipe and then the outer gaseous fuel pipe. Between the inner gaseous fuel pipe and the outer gaseous fuel pipe, preferably the pilot fuel pipes are provided in the rear section. However, the course of the pilot fuel pipes can, in one or more portions of the rear section, be at an angle to the longitudinal axis of the fuel supply arrangement. Between the fuel lance and the inner gaseous fuel pipe, an interspace, filled with air, preferably is provided.

Furthermore, it is preferred that the intermediate section the gaseous fuel pipe is provided individually from, parallel to and axially offset to the liquid fuel pipe. The gaseous fuel pipe, after leaving the burner flange, provides the continuation of the housing of the gaseous fuel pipe, which in section is provided in the space between the inner gaseous fuel pipe and the outer gaseous fuel pipe.

According to another preferred embodiment of the present invention, between the gaseous fuel pipe in the rear section and the gaseous fuel pipe in the intermediate section, an interface is provided, said interface being disposed at an angle α adapted to guide the gaseous fuel frontwardly and outwardly with respect to the longitudinal axis of the fuel supply arrangement. Said angle can be any angle of 0-90 degrees, preferably an angle of about 45 degrees.

Furthermore, a fuel supply arrangement is suggested, wherein the liquid fuel pipe is provided as a fuel lance extending parallel to the longitudinal axis of the fuel supply system and over all three sections thereof until an injection port of the liquid fuel at the front tip of the fuel lance into the mixing section of a burner. Thus, the fuel lance preferably does not change its course while extending over the fuel supply arrangement.

It is advantageous if in the intermediate section the gaseous fuel pipe is provided parallel to the fuel lance. Said gaseous fuel pipe has its own longitudinal axis, which thus is preferably provided parallel to the longitudinal axis of the fuel supply system.

Preferably, in at least one portion of at least one of the three sections of the fuel supply system at least one fuel pipe is designed such as to compensate for thermal expansion during operation.

Furthermore, preferably the liquid pilot fuel pipe and/or the pilot gas pipe is arranged as a spiral or as at least one essentially circumferential portion around the fuel lance and/or another fuel pipe.

A further preferred fuel supply arrangement is provided with a mounting support for the fuel lance. The fuel supply arrangement is preferably held by at least one support in each section. In the rear section, preferably the connection block to the fuel distribution system and/or the backplate serve this support function, whereas in the intermediate section the burner flange, and in the front section the back wall of the gaseous fuel plenum provide support to the fuel lance, preferably in addition to supporting other fuel pipes as well.

Further embodiments of the present invention are outlined in the dependent claims.

DETAILED DESCRIPTION

Referring to the drawings, which are for the purpose of illustrating the present preferred embodiments and not for the purpose of limiting the same, FIG. 1 shows a schematic axial cut through a gas turbine with two sequential combustion chambers. The depicted gas turbine comprises a circular row of environmentally friendly v-shaped burners 16 (as called EV-burner) and of sequential self-ignition combustion chamber 18.

In such a sequential combustion system, combustion air is compressed in the compressor 13 and is then guided into the first combustion chamber 17, an annular combustion chamber with a circle of several EV-burners 16, where it is heated. After the injection of fuel and its mixing with the combustion air, the mixture is expanded in a first turbine/expansion stage 36 and guided into a sequential self-ignition combustion chamber 18 (as called SEV-burner), where the air is mixed with fuel again. The gas is then expanded through a second turbine/expansion stage 14. Thereby, thermal energy is transformed to mechanical energy, which is partially used to drive the compressor 13, but mainly to drive a generator or the like.

The depicted combustion system has, described from outside to inside, a peripheral turbine wall 27, followed by a flow space 35 for compressed air located between said turbine wall 27 and a burner housing 40 around the annular combustion chamber 17 and a distribution chamber 33.

From right to left in FIG. 1, a compressor 13 is provided "below" (with respect to the figure) a fuel supply arrangement. The fuel supply arrangement is divided into three sections A, B, C. The rear section C of the fuel supply system/arrangement is located behind the turbine wall 27, and is provided with a burner flange 7, with which the fuel supply arrangement is mounted/fastened in an opening 44 of the turbine wall 27. An intermediate section B is located between said turbine wall 27 and a backside wall 28 of a distribution chamber 33 located annularly around the turbine axis A and housing the multi-cone swirl generator/mixing section of the burner 16. Said fuel supply system is mounted in an opening of the backside wall 28 with a heat retaining shield 10. Therefore, the fuel supply arrangement is fastened/held, i.e. clamped/anchored at least at two points in the turbine: firstly it is mounted within opening 44 of the turbine wall 27, anchored in said opening 44 by flange 7, and secondly within an opening 47 in the backside wall 28 of the distribution chamber 33.

The front section A is located in front of said backside wall 28 of the distribution chamber 33 and connects the fuel supply arrangement to the multi-cone burner arrangement 16 via a burner central backside block 29. Left/downstream of said backside block 29, which is designed as a pressure cast part, and downstream of the burner 16, the annular combustion chamber 17 follows. The self-ignition combustion chamber 18, has optional a vortex generator/swirler 20 in order to create turbulences in the combustion air so as to allow better mixing with the fuel injected into the flow path in the second sequential combustion chamber 30. Following combustion and heating in said second sequential combustion chamber 30, the gas is expanded in a second turbine stage 14.

Figure 2:
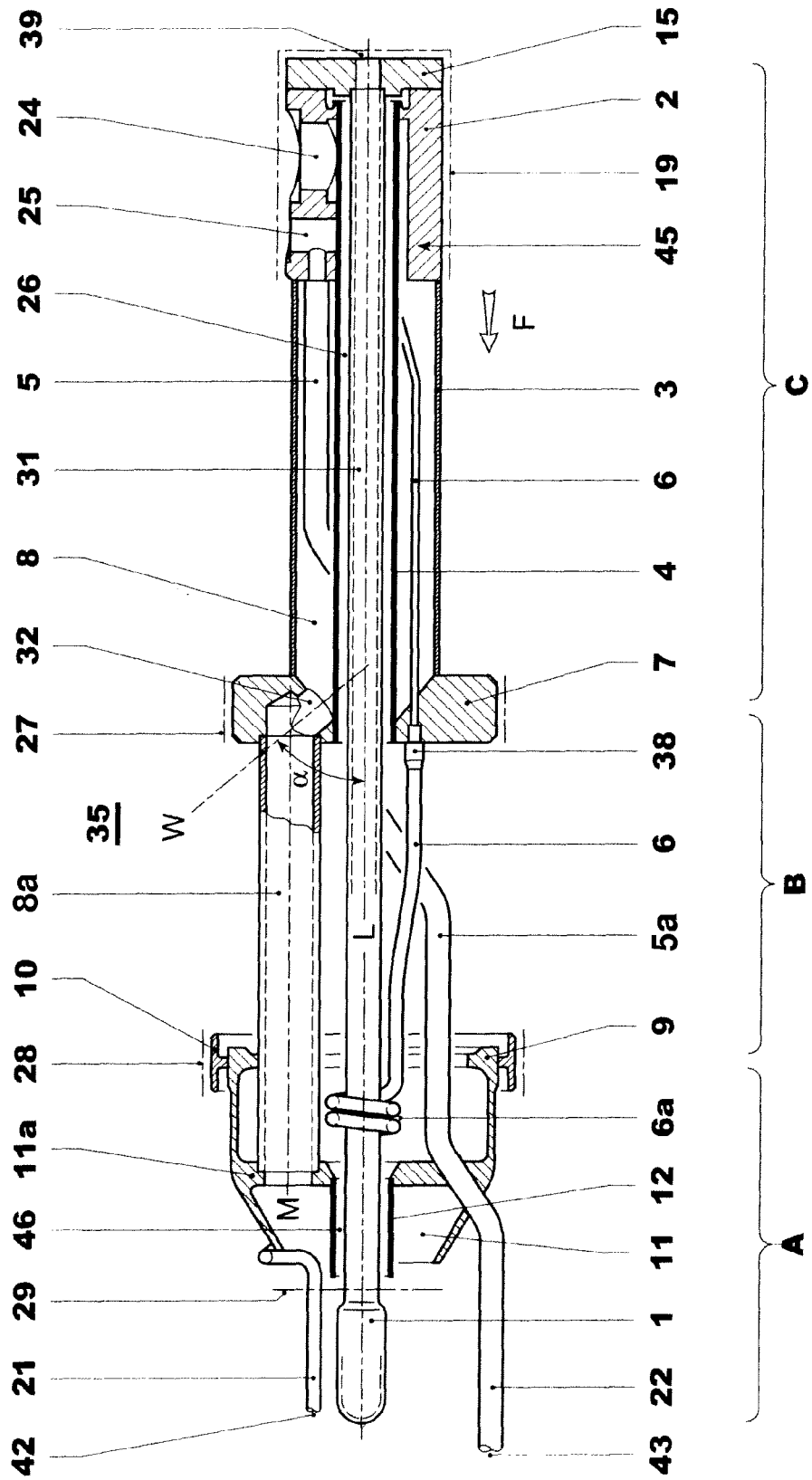
FIG. 2 is schematic axial cut through a fuel supply arrangement according to one embodiment of the present invention.

In FIG. 2, a fuel supply arrangement according to one embodiment of the present invention is shown schematically. The fuel supply system shown extends from the interface 19 to the fuel distribution system (not shown) on the far right in the figure to the tip of the fuel lance 31 on the far left and comprises, with respect to the longitudinal axis L of the fuel supply arrangement the three sections A, B, C mentioned above. Section C is limited on the far right by a introduction element 45, which comprises a connecting block 2 and a back plate, surrounded by an interface 19 to the main fuel distribution system (not shown), indicated by a dotted line in FIG. 2. Said introduction element 45 houses the fuel entry ports (24, 25, 39). Section C is divided from section B by burner flange 7, which anchors the fuel supply system in the opening 44 of the turbine wall 27 (shown in FIG. 1) and also has a shielding function. In FIG. 2, a dotted line indicates the connection point for the turbine wall 27. Furthermore, section B is divided from section A by a pot-like element, which is fastened to the backside block 28 of the distribution chamber 33 (air plenum, shown in FIG. 1) over a heat retaining shield 10, which is supported by a flange 9. Coming from the rear end of the fuel supply arrangement, i.e. the main fuel distribution system (not shown), from the rear section C over the intermediate section B to the front section A, various fuel pipes 5, 6, 8, and fuel lance 31 extend across these dividing elements 45, 7, (core elements of the fuel supply arrangement) to the front end of the fuel supply arrangement. According to FIG. 2, the rear section C is connected on the right side to an interface to the main fuel distribution system (not shown) with a connection block 2. Said block 2 comprises toward the rear a backplate 15. The fuel disposed within the interface 19 surrounds the connection block 2 and the backplate 15 before entering into the fuel entry ports 23, 24, 25, 39. Both the connection block 2 and the backplate 15 are summarized for explanation purposes as introduction element 45. Said introduction element 45 has four fuel connections, i.e. a liquid fuel entry port 39, a gaseous fuel entry port 24, a pilot gas entry port 25 and liquid pilot fuel entry port 23 (shown in FIG. 3), and directs the fuel into the corresponding fuel supply circuits 1, 5, 6, 8. The entry port 24 for the gaseous fuel as well as the entry port 25 for the pilot gas are arranged such that the fuel is introduced radially into their respective pipes 5, 8, at an angle perpendicular to the main longitudinal axis L of the fuel supply arrangement. The entry port 23 (see FIG. 3) for the liquid pilot fuel into the liquid pilot fuel pipe 6 is not shown in FIG. 2 as the entry port is arranged perpendicularly to the other two entrance ports 24, 25. It is possible to arrange the fuel entry ports at other angles as well. Liquid fuel is supplied into the combustion chamber through a fuel lance 31. An entrance port 39 for the liquid fuel is provided such that the liquid fuel is injected into the liquid fuel pipe in an axial direction with respect to the longitudinal axis L of the fuel supply system. In said rear section C, four fuel pipes are thus present: The liquid fuel pipe 1, preferably for oil, which continues in a straight design axially over all three sections A, B, C along and axial with the longitudinal axis L of the fuel supply arrangement; furthermore pipe 8 for the gaseous fuel, which in the rear section C passes between an inner pipe 4, with an interspace 26, and an outer pipe 3; Said pipe 1 for the liquid fuel is provided in FIG. 2 as the fuel lance 31, extending coaxially and concentrically with the gaseous fuel pipe 8 and its pipes 3, 4 respectively in section C. Therefore, the liquid fuel pipe 1 and the gaseous fuel pipe 8 are arranged as three concentric pipes 3, 4, 31 in the rear section C; furthermore a pipe 5 for pilot gas is located radially outside of the liquid fuel pipe 1 and within the gaseous fuel pipe 8 over a large portion of the rear section C; and, also radially outside of the liquid fuel pipe 1 and within the gaseous fuel pipe 8, a liquid pilot fuel pipe 6 is provided, guided in the liquid pilot fuel pipe according to FIG. 2. According to FIG. 2, in section C, the pilot gas pipe 5 and the liquid pilot fuel pipe 6 are separate pipes, both located in the interface 32 between the walls of the inner pipe 4 and the outer pipe 3, thus within the gaseous fuel pipe 8. Coming from the rear, i.e. the right side in FIG. 2, pipe 5 for the pilot gas changes its initial direction before reaching the burner flange 7, the corresponding pilot gas pipe 5 describing a partially circumferential section for the purpose of compensating for thermal expansion, before continuing in an axially offset direction in section B. Said compensation effect is due to the elastic property that a pipe section gains in axial direction when it is arranged circumferentially with respect to the longitudinal axis L of the arrangement instead of axially. In effect, preferably each pilot fuel pipe 5, 6 contains at least one at least partial circumferential section in at least one, preferably each of the sections A, B, C of the fuel supply arrangement. In the upstream area, i.e. the rear section C, the gaseous fuel pipe 8 is made from two concentric pipes 3, 4. The connection block 2 to the fuel distribution system and the burner flange 7 are preferably welded to said pipes 3, 4. Between sections C and B, within the burner flange 7, an interface 32 is provided, where the circumferential gaseous fuel pipe 8 merges into a single pipe. Before entering said interface 32, the gaseous fuel is piped from the circumferential pipe 8 made from concentric pipes 3 and 4, into a conical area within the flange 7 and then diverged into said interface 32. The interface 32 has an axis W, which is at an angle with respect to the main longitudinal axis L of the fuel supply arrangement at an angle α. In FIG. 2, said angle α is about 45 degrees, however, other angles between 0 and 90 degrees are possible. The angled arrangement of the interface 32 allows for a low flow resistance.

The gaseous fuel pipe 8 continues non-concentrically with the liquid fuel pipe 1, i.e. the fuel lance 31, throughout the entire length of the intermediate section B along the longitudinal axis L. Thus, in the intermediate section B, the gaseous fuel flows through a gaseous fuel pipe 8a parallel to the longitudinal axis L, traverses the pot-like element which marks the transition between section B and section A.

Figure 3:
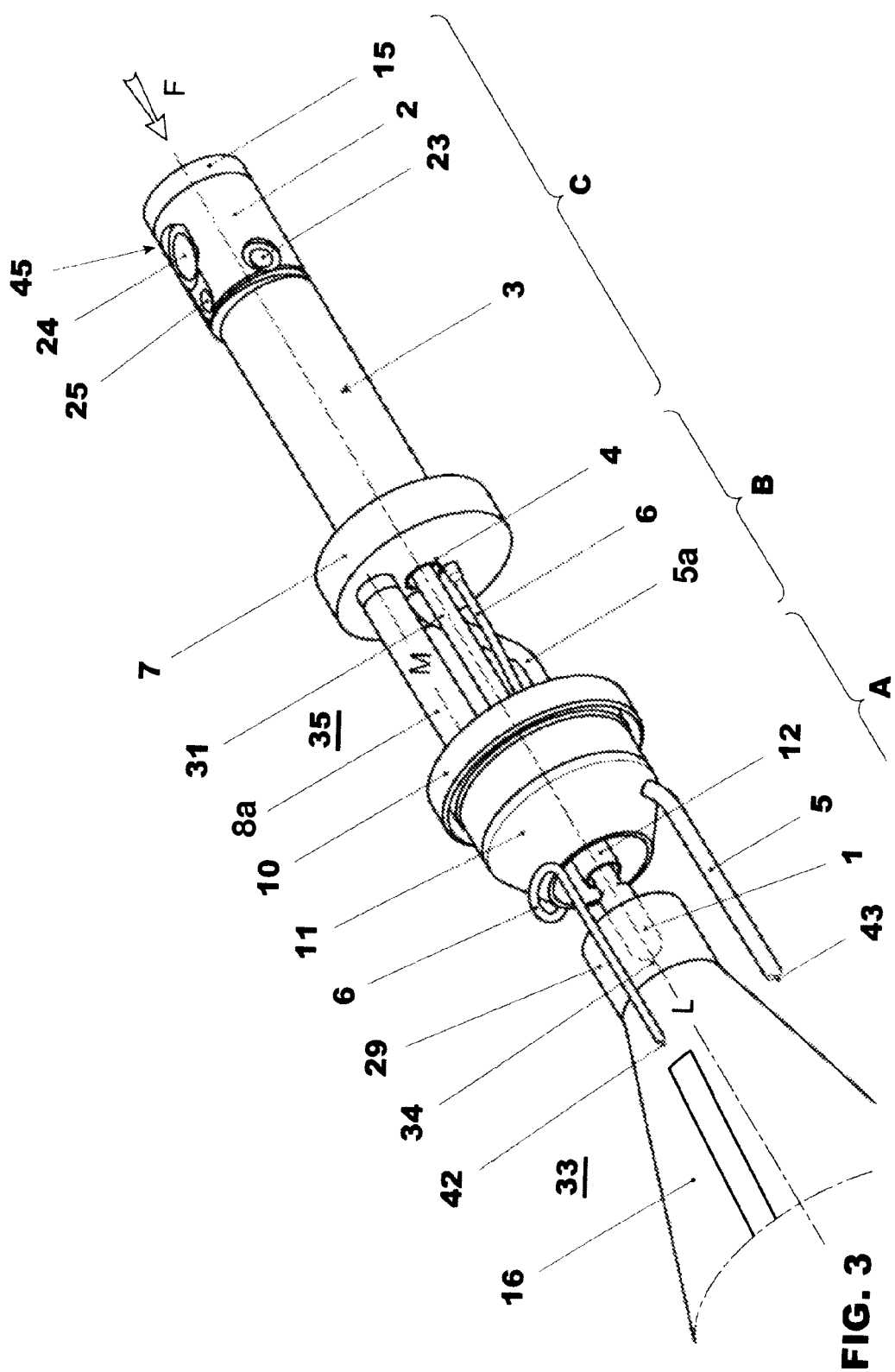
FIG. 3 is a perspective view of a fuel supply arrangement of FIG. 3, wherein, however, in the rear section C the pipes disposed within the outer gaseous fuel pipe are not shown.

In the intermediate section B, four fuel pipes are present in parallel arrangement. In FIG. 3, over the entire intermediate section B, the gaseous fuel pipe 8 is provided as a pipe, with a longitudinal axis M radially offset outwardly from the other three pipes 1, 5, 6, parallel to the longitudinal axis L of the fuel supply arrangement. Below the gaseous fuel pipe 8, the liquid fuel pipe 1 in form of the fuel lance 31 is located parallel to and "below" of said gaseous fuel pipe 8a. Said separate conduct of the four fuel pipes in separate fuel pipes 5, 6, 8, 31 continues through the entrance to the distribution chamber 33 (air plenum, shown in FIG. 1) or through its backside wall 28, respectively, where a heat retaining shield 10 is supported on support 9.

After passing through the cavity of the pot-like element, which is preferably filled with air, the gaseous fuel pipe 8a merges into a gaseous fuel plenum 11, with a back wall 11a located at the far left in the figure in the front section A. Thereby, when leaving the gaseous fuel pipe 8, the gaseous fuel enters into a circumferential pipe again in section A, embodied by the gaseous fuel plenum 11.

Interior of the heat retaining shield 10, the liquid pilot fuel pipe 6a is spiraled about the fuel lance 31. This spiral arrangement can also be located in any of the three sections A, B, C. It has the purpose to compensate for the thermal expansion.

Such compensators can be introduced into the system by such a spiral arrangement or any other pipe arrangement known to allow thermal tolerances. As described before, the pilot gas pipe 5 as well as the liquid pilot fuel pipe 6 can be provided with a "partially spiraled" (6a)/partially circumferential section, in any, preferably at least one, preferably in each of the three sections A, B, C.

Each fuel pipe can be provided in several portions, which can be welded together and coupled to the different dividing elements such as for example the introducing element 45, the burner flange 7, or the pot-like element, e.g. by a coupling element 38.

At extension tube 12, an interspace 46 is provided, which is filled with air, of the gaseous fuel inner pipe 4 surrounds the fuel lance 31 in a concentric arrangement in the gaseous fuel plenum 11 continuing downstream from a pot-like element. Therefore, in the front section A, the pipes 5, 6 for liquid pilot fuel and pilot gas are still located separately from and non-concentrically with the liquid fuel pipe 1 and/or the gaseous fuel pipe 8. However, the gaseous fuel pipe 8 and the liquid fuel pipe 1 are again arranged concentrically within at least one portion of this front section A. The tip 34 of the fuel lance 31, which is provided with openings for the injection of liquid fuel into the combustion air stream, is located downstream of the interface 29 to the burner-swirler with respect to the liquid fuel flow direction F, extending through burner central backside block 29 into the tip of the burner cone.

As mentioned above, the gaseous fuel pipe 8 is guided into a gaseous fuel plenum 11 after passing the heat retaining shield 10. In the area of the gaseous fuel plenum 11, the gaseous fuel is again piped concentrically with the liquid fuel pipe 1, the extension tube 12 and the gaseous fuel plenum 11 surrounding the fuel lance 31 concentrically. The plenum in the front section C has a diameter greater than the diameter of the gaseous fuel pipe in the intermediate section B and preferably also greater than the annular gaseous fuel pipe 8 comprised of the concentric inner and outer gaseous fuel pipes 3 and 4 in the rear section C. Preferably, the gaseous fuel plenum 11 is designed with tapered walls, wherein the diameter of the plenum at the gaseous fuel injection port is smaller than the diameter of the plenum at its interface to the front end of the gaseous fuel pipe 8.

Thus, as the liquid fuel pipe 1 extends partially into the burner cone, and the gaseous fuel is injected from annularly disposed openings in the plenum 11 at the interface 29 to the burner-swirl body, the liquid fuel is injected into the burner further upstream than the gaseous fuel with respect to the liquid fuel flow direction F.

Preferably, at the interface 29 to the burner-swirler, the parts of the fuel supply system are welded to parts of the annular burner arrangement. Preferably, the burner-swirler), the extension tube 12 and the gaseous fuel plenum 11 are welded together.

For the purpose of pilot fuel injection, at least one pipe 5, 6 is provided via connections 21, 22 to supply liquid pilot fuel and/or pilot gas fuel from the end of the burner 16 to the fuel injection port, designed as a liquid pilot fuel injection nozzle and a pilot gas plenum (not shown). At connections 21 and 22, the pilot gas pipe 5a and the liquid pilot fuel pipe 6a are coupled to their injection ports even further downstream than the liquid fuel into the burner 16 (shown in FIG. 1), preferably formed as a cone. FIG. 2 shows pilot pipes 5 and 6 located radially offset with respect to the liquid fuel pipe 1. The liquid pilot fuel pipe 6a extends to a connection 21 to its injection port within the combustion chamber 17 (shown in FIG. 1). The liquid pilot fuel- and pilot gas pipes 5, 6 are not drawn in their full length in FIG. 2. In effect, the injection ports for liquid pilot fuel and pilot gas, respectively, are connected to the pipes by connections 21, 22, which can be made integrally with the pipe(s) and the injection port(s), and are located further downstream than the connections 21, 22 depicted in the figure. The ends 42, 43 of said pipes 5, and 6, respectively can be seen in FIG. 3.

FIG. 3 shows the fuel supply arrangement of FIG. 2, however, in section C, the pipes disposed within the outer gaseous fuel pipe 3, which are the fuel lance 31, the pilot gas pipe 5a and the liquid pilot fuel pipe 6a, as well as the inner gaseous fuel pipe 4, are not shown. Said pipes exit the burner flange in the intermediate section B, which is provided with a flow space 35 of combustion air, as fuel lance 31, pilot gas pipe 5a and liquid pilot fuel pipe 6a, as well as gaseous fuel pipe 8a (continuation of inner and outer gaseous fuel pipes 3, 4) and are visible from then on again. In FIG. 3, the circumferential portion of the liquid pilot fuel pipe 6 in the front section A is better visible than in FIG. 2.

LIST OF REFERENCE NUMERALS

1 Liquid fuel pipe
2 Connection block to fuel distribution system
3 Gaseous fuel outer pipe
4 Gaseous fuel inner pipe
5 Pilot gas pipe
6 Liquid pilot fuel pipe
6a Spiraled pipe
7 Burner flange
8 Gaseous fuel pipe
9 Support for heat retaining shield
10 Heat retaining shield
11 Gaseous fuel plenum
11a Back wall of 11
12 Extension tube
13 Compressor
14 Second expansion phase, turbine
15 Back plate
16 Premix-burner, multi-cone burner arrangement
17 First annular combustion chamber
18 Self-ignition combustion chamber
19 Interface to fuel distribution system
20 Vortex generator
21 Connection to liquid pilot fuel injection port
22 Connection to pilot gas injection port
23 Liquid pilot fuel entry port in 2
24 Gaseous fuel entry port in 2
25 Pilot gas entry port in 2
26 Inter space
27 Turbine wall
28 Backside wall of 33
29 Burner central backside block, interface to burner-swirler, pressure cast part
30 Second sequential combustion chamber
31 Fuel lance
32 Interface between 3, 4 and 8a, i.e. between 8 in C and 8 in B
33 Distribution chamber
34 Combustion chamber backside wall
35 Flow space of compressed air
36 First expansion phase, turbine
37 Turbine housing
38 Coupling element
39 Liquid fuel entry port
40 Burner housing
42 Liquid pilot fuel injection port
43 Pilot gas fuel injection port 44 Opening in 27
45 Introduction element comprising 2 and 15
46 Inter space between 12 and 31
47 Opening in 28
A Front section between 28 and 29, first section
α Angle between L and W
B Intermediate section between 27 and 28, second section
C External rear section behind 27, third section
F Liquid fuel flow direction
L Longitudinal axis of fuel supply system
M Axis of 8 in B
T Longitudinal axis of gas turbine
W Longitudinal axis of 32

What is claimed is:

1. A fuel supply arrangement for a gas turbine burner (16), comprising a rear section (C) external to the burner (16) located between a turbine wall (27) and a fuel distribution system interface (19) directing fuel into fuel supply circuits, said fuel distribution system interface (19) having four fuel connections, for liquid fuel, gaseous fuel, pilot gas and liquid pilot fuel; an intermediate section (B) located between the turbine wall (27) and the backside wall (28) of a distribution chamber (33); and a front section (A) in front of the second section (B) located between said backside wall (28) of the distribution chamber (33) and a burner central backside block (29); said fuel distribution arrangement comprising a pipe (8) for gaseous fuel, a pipe (1) for liquid fuel, particularly oil, as well as a pipe (5) for pilot gas, and a pipe for liquid pilot fuel (6), particularly pilot oil;
wherein in the rear section (C) the pipe (8) for gaseous fuel and the pipe (1) for liquid fuel are arranged concentrically, and in at least one portion of the intermediate section (B) the pipe (8) for gaseous fuel is arranged non-concentrically with the liquid fuel pipe (1).

2. Fuel supply arrangement of claim 1, wherein in at least one portion of the intermediate section (B) the gaseous fuel pipe (8) is comprised of at least one pipe (8a) outside the periphery of the wall of the liquid fuel pipe (1).

3. Fuel supply arrangement of claim 2, wherein the at least one portion of the intermediate section (B) the gaseous fuel pipe (8) is comprised of at least one, preferably 2, 3, 4, or 5 pipes (8a).

4. Fuel supply arrangement according to claim 1, wherein in the rear section (C) the gaseous fuel pipe (8) is at least one of comprised of or bordered by an inner pipe (4) and an outer pipe (3) and that in the rear section (C) the liquid gas pipe (1) is arranged coaxially and concentrically within said inner gaseous fuel pipe (4).

5. Fuel supply arrangement according to claim 1, wherein in at least one portion of the rear section (C) at least one of the pilot gas pipe (5) or the liquid pilot fuel pipe (6) is guided within the gaseous fuel pipe (8).

6. Fuel supply arrangement according to claim 1, wherein in the rear section (C) the liquid fuel entry port (39) is located in the fuel distribution system interface (19) such that the liquid fuel is axially introduced into the liquid fuel pipe (1) from the rear and at least one of the gaseous fuel entry port (24) or the pilot gas entry port (25) is located in the fuel distribution system connection block (2) such that at least one of the gaseous fuel or the pilot gas is radially introduceable into at least one of the gaseous fuel pipe (8) or the pilot gas pipe (5) or the liquid pilot fuel pipe (6), preferably perpendicular to a liquid fuel flow direction (F).

7. Fuel supply arrangement according to claim 1, wherein in at least one portion of the rear section (C) at least some of the fuel pipes (1, 8) are arranged as three concentric pipes (3, 4, 31).

8. Fuel supply arrangement according to claim 1, wherein in the intermediate section (B) the gaseous fuel pipe (8a) is provided individually from, parallel to and axially offset to the liquid fuel pipe (1).

9. Fuel supply arrangement according to claim 1, wherein between the gaseous fuel pipe (8) in the rear section (C) and the gaseous fuel pipe (8) in the intermediate section (B), an interface (32) is provided, said interface (32) being disposed at an angle (α) adapted to guide the gaseous fuel frontwardly and outwardly with respect to the longitudinal axis (L) of the fuel supply arrangement.

10. Fuel supply arrangement according to claim 1, wherein the liquid fuel pipe (1) is provided as a fuel lance (31) extending parallel to the longitudinal axis (L) of the fuel supply system and over all three sections (A, B, C) thereof until an injection port of the liquid fuel at the front tip (34) of the fuel lance (31) into the mixing section of a burner (16).

11. Fuel supply arrangement according to claim 1, wherein in the intermediate section (B) the gaseous fuel pipe (8a) is provided parallel to the fuel lance (31).

12. Fuel supply arrangement according to claim 1, wherein in at least one portion of at least one of the three sections (A, B, C) of the fuel supply system at least one fuel pipe (3, 4, 5a, 6a, 8a, 31) is designed such as to compensate for thermal expansion during operation.

13. Fuel supply arrangement according to claim 11, wherein at least one of the liquid pilot fuel pipe (6a) or the pilot gas pipe (5a) is arranged as a spiral or as at least one essentially circumferential portion around at least one of the fuel lance (31) or another fuel pipe.

14. Fuel supply arrangement according to claim 1, wherein a mounting support (2, 7, 11a, 15) for the fuel lance (31) is provided.

* * * * *